J. MIHALYI.
BINOCULAR.
APPLICATION FILED DEC. 19, 1917.
1,290,279.
Patented Jan. 7, 1919.
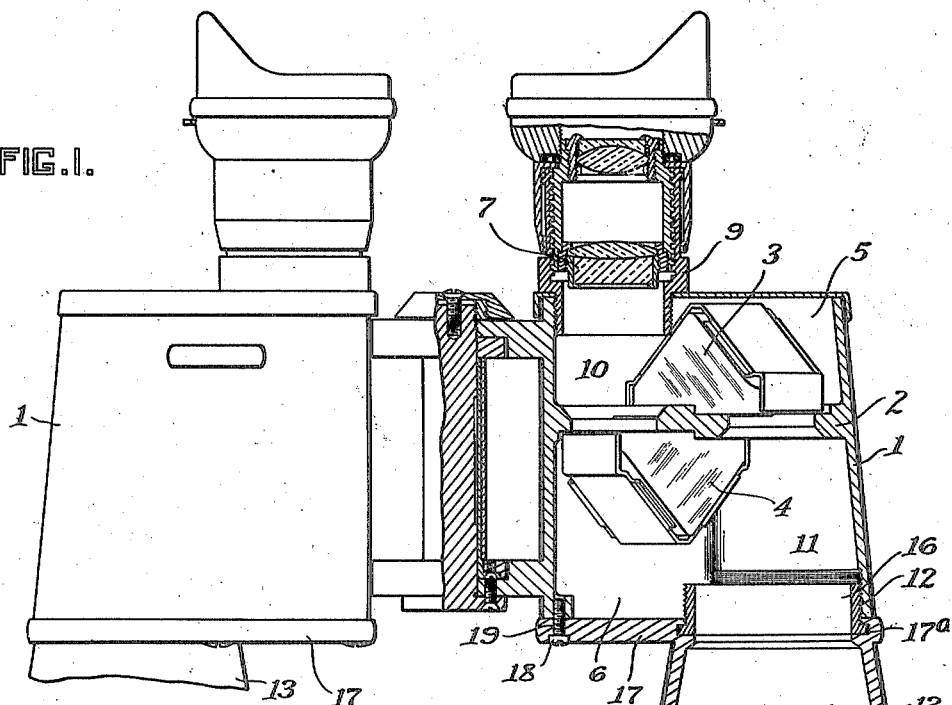
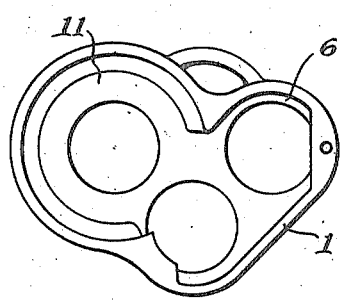
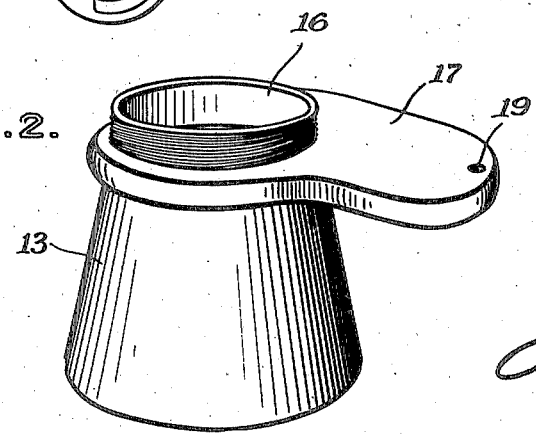
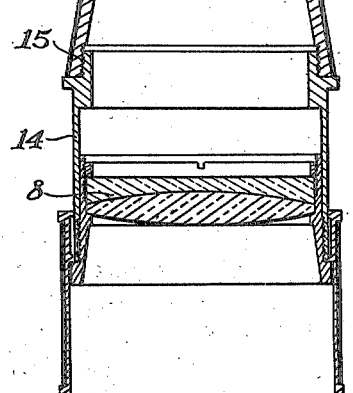
INVENTOR:
Joseph Mihalyi
by Davis & Simms
his attorneys

UNITED STATES PATENT OFFICE.

JOSEPH MIHALYI, OF ROCHESTER, NEW YORK, ASSIGNOR TO CROWN OPTICAL COMPANY, OF ROCHESTER, NEW YORK, A CORPORATION.

BINOCULAR.

1,290,279.  Specification of Letters Patent.  Patented Jan. 7, 1919.

Application filed December 19, 1917. Serial No. 207,922.

*To all whom it may concern:*

Be it known that I, JOSEPH MIHALYI, a citizen of the United States, and resident of Rochester, in the county of Monroe and State of New York, have invented certain new and useful Improvements in Binoculars, of which the following is a specification.

The present invention relates to binoculars and more particularly to the type in which two casing members are connected together and each is provided with an eyepiece, an objective and one or more prisms between each eyepiece and its objective, an object of this invention being to provide an extension for each casing to increase the power of the instrument, the extension being so connected to the casing that lateral blows on the extension will not destroy the optics of the instrument.

To this and other ends, the invention consists of certain parts and combinations of parts, all of which will be hereinafter described, the novel features being pointed out in the appended claims.

In the drawings:—

Figure 1 is a view showing one half of the instrument in section and a portion of the other half in elevation;

Fig. 2 is a perspective view of the casing extension;

Fig. 3 is a detail view showing the form of the extension attaching flange or ring; and Fig. 4 is a view of the bottom of the casing with the extension removed.

Prior to this invention it has been suggested to increase the power of small power binoculars by connecting extensions to the casing members and mounting the higher power objectives on the extensions. In carrying out this feature in prism binoculars in which the objective chambers connect laterally with the prism chambers, it has been found that the extensions do not have proper lateral support, and when the instrument receives a blow on an extension its usefulness is destroyed, due to the fact that the walls of the casing spread apart between the objective chamber and prism chamber so that the proper relation of the optical parts of the instrument is lost.

The foregoing objections are overcome in this invention by providing the casing extensions with rigid laterally projecting members which extend across the prism chambers and bear on the casings opposite the communicating openings between the prism chambers and the objective chambers, these members preferably acting as covers for the lower ends of the casings to close the prism chambers.

Referring more particularly to the drawings which illustrate one embodiment of the invention, 1 indicates the casing members each of which, in this instance, has a partition 2 provided with seats for the prisms 3 and 4 arranged in the prism chambers 5 and 6, respectively, said prisms optically connecting the eyepiece 7 and the objective 8 in a manner known in this art. The eyepiece mounting 9 connects with an eyepiece chamber 10 which lies to one side of the prism chamber 5, and to one side of the prism chamber 6 an objective chamber 11 is provided. This objective chamber connects laterally with the prism chamber at the side of it, this opening being necessary in order not to interfere with the optics of the instrument.

In small power binoculars the mounting for the objective is connected directly to the casing, and in order to use the same casings for high power instruments, it is customary to interpose a casing extension between the objective mounting and the ordinary casing. These extensions have been heretofore connected to the casings in such a manner that lateral blows on the objective mountings or casing extensions have caused such casing extensions to deflect laterally, due to the fact that one side of each casing extension is unsupported, because it lies over a space or opening which connects the prism chamber 6 with the objective chamber 11.

When the instrument is used as small power binoculars, each objective mounting is connected to its casing member 1 by means of internal screw threads 12 in the objective chamber 11. These screw threads are also utilized in this invention for connecting the casing extensions to the casings 1. In this instance, each casing extension embodies a flaring portion 13 to the outer end of which the objective mounting 14 is secured by screw threads 15. The extension also has an attaching portion 16 which is in the form of a flange projecting from the casing extension 13, and preferably constructed by providing an externally threaded brass ring with a surrounding roughened or milled flange 17ª, this ring being embedded in the material of which the casing 13 is made, the casing 13, in this instance, being an aluminum die casting. Projecting from the extension 13 is a rigid member 17 which is rigid with the casing extension 13 and preferably integral therewith, being so formed that it will act as a cover for the objective end of the casing 1, thus closing the casing about the extension 13, and particularly closing the prism chamber 6. It will be seen that this extension abuts the casing 1 on that side of the prism chamber 6, which is opposite the opening between the prism chamber 6 and the objective chamber 7, thereby acting as a support for that side of the casing extension 13 which is in proximity to the prism chamber 6. While in the illustrated embodiment this lateral extension 17 acts as a cover for the casing, it is apparent that the invention is not limited to this form of the device. A screw 18 is passed through an opening 19 in the laterally extending cover 17 to engage the casing 1 in order to hold the casing extension against turning.

I believe myself to be the first to provide a lateral support for a casing extension on that side of such extension adjacent the proximate prism chamber, so that lateral blows on the casing extension will not tend to spread the walls of the casing in proximity to the prism chamber 6, and thus destroy the instrument.

What I claim as my invention and desire to secure by Letters Patent is:—

1. In binoculars, a casing having an objective chamber and a prism chamber to one side of the objective chamber opening to said objective chamber, the walls of the objective chamber having screw threads, a casing extension having screw threads engaging said screw threaded walls of said objective chamber, a casing cover rigid with the casing extension and abutting the casing to close the prism chamber, and an objective carried by said casing extension.

2. A casing extension for prism binoculars having a projecting screw-threaded portion for interlocking with the binocular casing and a cover rigid with said extension to close the prism chamber to one side of the extension and to abut the casing in order to remove strains from the interlocking connection.

3. In binoculars, a casing having a prism chamber, and an objective chamber to one side of the prism chamber opening laterally to said prism chamber and having screw threaded walls, a casing extension having a screw threaded portion engaging said threaded walls of the objective chamber and having a casing cover rigid therewith to abut the casing and close the prism chamber in order to provide lateral support for the casing extension on the casing opposite the opening between the prism chamber and the objective chamber.

4. In binoculars, a casing having a prism chamber and an objective chamber to one side of the prism chamber opening laterally to the prism chamber, a casing extension having a portion engaging the interior walls of the objective chamber, and a member rigid with the casing extension and extending across the prism chamber to abut the casing in order to remove strains from the screw threaded connection between the casing and the casing extension.

5. In binoculars, a casing having a prism chamber, and an objective chamber to one side of the prism chamber opening laterally to said prism chamber and having screw threaded walls, a casing extension having a screw threaded portion engaging said threaded walls of the objective chamber and having a casing cover rigid therewith to abut the casing and close the prism chamber in order to provide lateral support for the casing extension on the casing opposite the opening between the prism chamber and the objective chamber, and a screw passing through the casing cover to secure the casing extension against turning.

JOSEPH MIHALYI.